United States Patent [19]

Naber et al.

[11] 4,007,129

[45] Feb. 8, 1977

[54] PARTIAL COMBUSTION PROCESS FOR MANUFACTURING A PURIFIED GAS CONTAINING HYDROGEN AND CARBON MONOXIDE

[75] Inventors: Jaap E. Naber, Amsterdam; Bernardus H. Mink, The Hague, both of Netherlands

[73] Assignee: Shell Oil Company, Houston, Tex.

[22] Filed: Nov. 21, 1974

[21] Appl. No.: 525,799

[30] Foreign Application Priority Data

Nov. 27, 1973 United Kingdom ............. 54876/73

[52] U.S. Cl. ................................ 252/373; 252/375
[51] Int. Cl.$^2$ ....................... C01B 2/02; C01B 2/14
[58] Field of Search ......... 252/373; 48/215, 197 R; 423/223

[56] References Cited

UNITED STATES PATENTS

| | | | |
|---|---|---|---|
| 2,564,736 | 8/1951 | Stokes | 252/373 |
| 2,886,405 | 5/1959 | Benson et al. | 423/223 |
| 2,980,523 | 4/1961 | Dille et al. | 252/373 X |
| 2,992,906 | 7/1961 | Guptill | 252/373 X |
| 3,563,695 | 2/1971 | Benson | 423/223 |
| 3,563,696 | 2/1971 | Benson | 423/223 |
| 3,615,297 | 10/1971 | Dille et al. | 48/215 |
| 3,639,261 | 2/1972 | Slater | 252/373 |
| 3,866,411 | 2/1975 | Marion et al. | 252/373 |

OTHER PUBLICATIONS

Kirk–Othmer, Encyclopedia of Chemical Technology, 2nd. Ed., vol. 4, 360–361.

*Primary Examiner*—Howard T. Mars
*Attorney, Agent, or Firm*—Dean F. Vance

[57] ABSTRACT

An improved process for manufacture of a purified gas containing hydrogen and carbon monoxide is described wherein a fuel is partially combusted in a reactor to produce a crude gas product containing soot, ash and contaminating gases such as HCN, $H_2S$ and COS, the crude gas product is subsequently cooled in a waste heat boiler and the cooled gas is washed in a scrubber to remove the entrained soot particles. In this improved process, removal of soot, ash and gaseous contaminants from the cooled crude gas product is facilitated by washing the cooled gas in a scrubber with an aqueous salt solution containing at least 10% by weight of an alkaline water-soluble salt, which salt solution is subsequently regenerated by removal of absorbed gases and suspended solids (soot and ash) and recycled to the scrubber.

12 Claims, No Drawings

PARTIAL COMBUSTION PROCESS FOR MANUFACTURING A PURIFIED GAS CONTAINING HYDROGEN AND CARBON MONOXIDE

BACKGROUND OF THE INVENTION

The present invention relates to a process for manufacturing a hydrogen and carbon monoxide containing gas by partially combusting a fuel in a reactor, cooling the gas obtained in a waste heat boiler and washing the cooled gas in a scrubber to remove entrained soot particles. More particularly, the invention is directed to an improvement in the above-mentioned conventional process wherein the cooled gas washing step is carried out in a manner such that soot separation occurs more readily and subsequent processing of the gas to remove conventional gaseous contaminants is substantially avoided.

By the partial, i.e., sub-stoichiometric combustion of gaseous liquid or solid hydrocarbonaceous fuel, a gas is obtained that predominantly consists of hydrogen and carbon monoxide. The fuel can be combusted with oxygen and this process may yield a synthesis gas for manufacturing, e.g., methanol or technically pure hydrogen. The carbon monoxide can be converted catalytically with steam to produce a gas containing more hydrogen. If air is used to support the combustion, the gas will contain nitrogen as well and may, for example, be used for manufacturing ammonia or for generating electricity. In the latter case the partial combustion is carried out at elevated pressure and the gas so obtained is usually first expanded through a gas turbine. In other instances, the partial combustion may be carried out at elevated pressures as well.

Generally, the gas that is obtained by partial combustion contains an amount of soot, ash and contaminating gases such as HCN, $H_2S$, COS, $CS_2$ and $CO_2$.

Depending on the type of fuel and on the operation conditions, amounts of soot of up to 3 or 4%w may be present in the crude gas product emanating from the partial combustion reactor. The soot particles are, in general, very small and cannot easily be removed from the crude gas at the moment the latter leaves the partial combustion reactor due to the high temperature of the gas. Normally, this temperature is higher than 1000° C.

The gas is typically passed from the reactor into a special waste heat boiler, which is designed to withstand the elevated pressures at which the gas is generated and to avoid becoming clogged by the soot contained therein. In a waste heat boiler with helically coiled tubes, for example, the soot is not deposited on the walls of the tubes. High-pressure steam can be generated in the waste heat boiler and the gas may, for example, be cooled to below 400° C.

After this cooling step the soot and other contaminants can be separated from the gas. According to one conventional procedure, the soot particles may, for example, be removed by "quenching" the gas with water in a scrubber in which the soot is washed out and an aqueous soot slurry is obtained. The ash is also taken up by the water. The temperature of the gas is further reduced by this soot removal step.

Subsequently the gaseous contaminants may be absorbed from the gas in an absorber column with the aid of an absorber liquid. Purification of the crude partial combustion gas by this two-step procedure is considered advantageous because contamination of the absorber liquid for gaseous contaminants with soot is avoided by this route.

However, separation of solid and gaseous contaminants in two separate steps is expensive and heat losses unavoidably occur in the process because of the temperature constraints inherent in the gaseous absorption step. Furthermore, the density of the soot obtained in partial combustion is typically rather close to that of water and as a result it is difficult to obtain a good separation of soot from water using conventional separation techniques.

The instant invention provides a process by which the soot and gaseous contaminant removal steps are combined in a single step and the problems associated with separate operation of each step are substantially eliminated.

SUMMARY OF THE INVENTION

Accordingly, the instant invention provides an improved process for manufacturing a hydrogen and carbon monoxide-containing gas by partially combusting a fuel in a reactor, cooling the crude gas obtained in a waste heat boiler and washing the cooled crude gas in a scrubber to remove entrained soot particles, characterized by the improvement which comprises washing the crude, cooled gas in a scrubber with an aqueous salt solution containing at least 10%w of an alkaline water-soluble salt, which salt solution is subsequently regenerated by removal of absorbed gases and suspended soot and recycled to the scrubber.

When the cooled gas is washed with the salt solution, the temperature in the scrubber may be higher than in the case of the abovementioned two-step process, because of the solution's capacity for removal of acid gases at temperatures much higher than those used in the conventional process. Accordingly, the temperature of the gas leaving the scrubber may also be higher than in the conventional process. This is in many cases an advantage; for example, when the gas must be subjected to further treatments, e.g., the catalytic conversion of carbon monoxide at higher temperature or when the gas is subsequently expanded through a gas turbine. Moreover, when the temperature of the purified gas leaving the scrubber is higher, this means that less steam has been condensed and so a smaller amount of contaminated condensate is obtained in the process. A high percentage of steam in the purified gas can be attractive for a variety of reasons; for example, when a catalytic conversion of carbon monoxide is to be carried out. Also, the energy left in the steam can be recovered when expanding the gas through a gas turbine.

As mentioned, the gas is washed with a salt solution. The subsequent separation of the soot from the salt solution will be easier than in the case wherein the gas is washed with water, because of the higher density of the solution versus that of the usual washing water. This higher density makes flotation and similar soot separation techniques easier.

By washing the gas with an alkaline solution, further contaminants such as ash, HCN, COS, $H_2S$ and $CO_2$ are effectively removed from the gas, so that a small amount of washing liquid is needed and the gas is cooled less deeply than in the two-step removal process.

The gas containing hydrogen and carbon monoxide is often produced at high pressure, for example, because it is needed at such a pressure or because energy is to be recovered therefrom by expansion through a gas turbine. It is preferred to operate the waste heat boiler and scrubber at substantially the same pressure as the reactor. In the two-step process according to the prior art, wherein soot and ash are removed with quenching water in a scrubber and contaminating gases with an absorber liquid in an absorber, the gas has to be cooled to the relatively low temperature at which the absorber is operated. This temperature is lower than the temperature at which the purified gas is available in the instant process.

A further advantage of the integration of the removal of soot and contaminating gases is the fact that the soot particles consist of highly active carbon that can absorb an additional quantity of contaminating gases so that less salt solution is needed than would be expected for gaseous absorption with the salts in question in the absence of soot.

DESCRIPTION OF THE PREFERRED EMBODIMENTS

Partial combustion according to the present invention can be suitably carried out using air, oxygen enriched air or oxygen as the oxidant source (oxygen-containing gas). In any case it is contemplated that the reaction will be conducted in a conventional manner under conditions of temperature and pressure such that the reaction is self-supporting. Accordingly, the reaction temperature, broadly stated, will range from about 700° to about 2000° C with the reaction pressures ranging from atmospheric up to about 600 psig. Within this broad range the reaction temperature and pressure are preferably 900°–1400° C and atmospheric to 30 psig, respectively, when air is used as the oxidant source with some what higher temperatures and pressures, e.g., 1100°–1700° C and atmospheric to 600 psig, being employed when oxygen is used as the source of oxygen-containing gas.

The hydrocarbonaceous fuels which are suitable for use in the process of the invention include any hydrocarbon-containing feed material which is capable of being made sufficiently fluid, i.e., by preheating and/or the addition of steam via conventional means to be injected by conventional nozzle devices into the partial combustion reactor. Natural gas or normally gaseous hydrocarbons such as $C_{2-4}$ saturated and olefinic hydrocarbons because of their availability and ease of handling are particularly suitable, however, heavier hydrocarbon fractions including gasoline, kerosene, naphtha, distillates, gas oils and residual oils can also be used as feed materials. In addition, such materials as coal distillation gas and the effluent from liquefaction or gasification of coal can also be suitably employed.

According to the present invention there is a special incentive, as mentioned above, to operate the scrubber at as high a pressure as possible. Accordingly, a preferred embodiment of the invention is to partially combust the fuel at elevated pressure in the reactor, to cool the gas obtained at substantially the same pressure in the waste heat boiler and to wash the gas at substantially the same pressure in the scrubber, the temperature of the solution in the scrubber being below its boiling point at the prevailing pressure. In this embodiment of the invention the temperature of the gas leaving the scrubber will be as high as possible.

Preferably, the gas is washed at such a pressure and temperature that substantially no steam is condensed therefrom during washing. An advantage thereof is that no additional amount of contaminated water is produced, so that no bleed stream disposal problems occur. Optionally, water is supplied to the gas prior to the washing in order to further saturate the gas; however, this is done not beyond the extent at which condensation starts. The latter measure contemplates that no water evaporates from the salt solution that is used in the scrubber, whereby the water balance for the process is such that no water from outside sources is needed.

The salt solution is preferably regenerated at substantially lower pressure than the pressure prevailing in the scrubber when the gas is washed at high pressure. This is desirable, since the removal of the adsorbed gases is facilitated by the resulting pressure drop.

The temperature of the cooled gas entering the said scrubber preferably lies above 150° C. In general, as mentioned above, the integrated removal of solid and gaseous contaminants from the gas leaving the waste heat boiler is more advantageous at higher temperatures. A temperature of the gas entering the scrubber of at least 250° C is preferred according to the invention.

The temperature of the washed gas leaving the scrubber in the process according to the invention, will in general lie below 150° C. The ultimate temperature depends on the temperature at which the gas enters the scrubber, on the dew point of the entering gases, on the amount of salt solution needed to remove the amount of soot present, etc. Under certain conditions the temperature at which the purified gas leaves the scrubber will lie above 150° C. Preferably, this temperature lies at least about 100° C.

Although the regeneration of the salt solution that is loaded with solid and gaseous contaminants will at least partly take place at a high temperature, it is preferred to cool the regenerated salt solution before it is recycled to the scrubber. According to a preferred embodiment of the invention, the temperature of the salt solution when entering the scrubber lies below 100° C.

Generally, according to the invention, the temperature of the salt solution when leaving the scrubber lies below 200° C. Preferably, this temperature would be above 150° C in order to ensure that the temperature of the purified gas leaving the scrubber is as high as possible.

The concentration of the alkaline salt solution should be at least 10%w according to the invention, in order to attain the desired effects. The concentration that can be used is limited by a diversity of factors, including the solubility of the salt under the operating conditions. In any case, care should be taken that the salt does not crystallize in the scrubber when operation is interrupted for some reason and the solution is permitted to cool down.

A preferred range of salt concentrations according to the invention is 30–40%w. At such concentrations, an attractive increase both in absorption capacity and in specific gravity of the solution is obtained, as compared to quench water, while the concentrated solution is still manageable.

Preferred salts include sodium and potassium carbonate, sodium and potassium phosphate and mixtures thereof. Solutions containing these salts have a fairly high capacity for absorbing the gaseous contaminants mentioned earlier on and the salts have a good solubility and thermal stability under the conditions prevailing during operation. It will be clear that other salts or combinations of salts may be used as well.

An attractive way of removing the absorbed gases from the load salt solution, which inter alia is preferably carried out before removal of the ash and soot, is by stripping the solution with steam in a stripper. In this regeneration procedure it is possible to use exactly the amount of steam, having an appropriately high temperature, needed to vaporize an amount of water equal to the amount of steam that condenses from the gas when it passed the scrubber. In this way the amount of recirculating salt solution and the concentration thereof are kept constant.

Stripping is preferably carried out with low-pressure steam of between 100° and 150° C. The pressure of the stripping steam can advantageously be of the same order as the pressure at which the solution is subsequently treated to remove soot and ash. This pressure will generally be about atmospheric.

Before, during or after removal of the absorbed gases from the solution the soot, and optionally also the ash, have to be removed from the salt solution.

According to a preferred embodiment of the invention the soot is removed from the salt solution in a pelletizer by pelletizing the soot particles and separating the pellets obtained from the salt solution. Pelletization, i.e., making pellets from the soot particles while they are suspended in the salt solution or float on top of it, can be carried out according to a variety of per se known methods.

Pelletization may be carried out, for example, by adding binder to the soot-containing salt solution while stirring vigorously and by then separating the agglomerates of soot and binder obtained from the salt solution. It is possible to carry out this pelletization in such a way that the ash is at least partly taken up by the pellets or agglomerates and so removed from the solution.

Pelletization may be carried out with all kinds of binder, such as binders based on hydrocarbon oil products. Examples of such binders are naphtha, gas oil and light fuel oil.

A suitable way to remove the soot from the salt solution is by taking up the soot particles, either as such or after pelletization, in a hydrocarbon phase. In this way separation of the soot particles or pellets from the salt solution is facilitated, especially because of the large difference in specific gravity between the concentrated salt solution and the hydrocarbon phase. A suitable hydrocarbon phase is a heavy hydrocarbon oil. The use of a heavy hydrocarbon oil makes it possible for example, to take up the soot particles directly in the fuel oil destined for the partial combustion, and so to recycle the soot.

According to another embodiment of the invention the soot particles are pelletized with naphtha and the agglomerates obtained, after having been separated from the salt solution, are taken up in a hot fuel oil. Accordingly, the naphtha is stripped off. The naphtha thus recovered is recycled to the pelletizer, while the fuel oil with soot is used as part of the fuel for the partial combustion.

When a sulfur-containing fuel is partially combusted, the hydrogen sulfide formed can be absorbed from the obtained gas by the salt solution and ultimately be removed therefrom by stripping. During combustion, HCN, COS, $CS_2$ and/or $CO_2$ may also have been formed in the reactor and these gaseous contaminants can also be removed and/or converted in the scrubber from the cooled gas which has left the waste heat boiler by absorption in the salt solution and ultimate removal therefrom by stripping.

According to the invention a hydrocarbonaceous fuel that contains traces of metal compounds can be subjected to the partial combustion. The ash formed is then taken up by the salt solution in the scrubber. The ash can be separated as insoluble alkaline compounds from the salt solution during regeneration thereof. When the soot is pelletized, the ash can be separated together with the soot. Preferably, when the washing of the gas with the salt solution in the scrubber is carried out to such an extent that steam condenses from the gas, the build-up of ash in the salt solution is prevented by withdrawal of a bleed stream before the salt solution is recycled to the scrubber, the concentration of salt in the salt solution being kept at a constant level. In this case, it is not necessary to specially separate the ash from the salt solution, provided that a certain permanent percentage of ash is permitted in the recycling salt solution.

The fuel to be partially combusted may contain, for example, compounds of vanadium, calcium, magnesium and other metals that are frequently encountered in hydrocarbon fuels or solid fuels.

The invention is further illustrated by the following example carried out according to the invention.

EXAMPLE

The apparatus used consists in its principal parts of an absorber column containing two sections of Raschig rings, a soot slurry flash tank, a pelletizer device and a stripper column.

A heavy fuel oil was partially combusted with oxygen in a reactor at a pressure of 30 atm., whereby a gas was obtained that predominantly consists of hydrogen and carbon monoxide and that contains 2.3%w of soot and ash, 1.1%v $H_2S$, 180 ppm by volume HCN and 210 ppm by volume COS. The temperature of this gas was about 1400° C when leaving the reactor and the gas was cooled to about 250° C by passing it through a waste heat boiler, thereby raising steam of high pressure. Part of this steam was passed to the stripper column for stripping the salt solution.

The cooled gas was passed, into the absorber column; near the bottom thereof, i.e., below the lower section of Raschig rings. In between the two sections of Raschig rings a concentrated aqueous solution of $Na_2CO_3$, having a temperature of about 100° C was introduced into the absorber column and passed down through the lower section. Make-up water was introduced near the top into the column and passed downward through both sections. At the top the gas is withdrawn from the column. The absorber column was operated at a pressure of about 30 atm.

At the bottom of the column the downwardly flowing water and $Na_2CO_3$-solution, having been in countercurrent flow contact with the gas, have gathered the soot and ash and acid gases that were present in the gas to the extent that the washed gas contains 15 ppm by weight of soot and ash, 19 ppm by volume $H_2S$, 9 ppm by volume HCN and 5 ppm by volume COS. A loaded salt solution was withdrawn at the bottom of the column and passed to the flash vessel at 170° C. In the latter vessel 10% of the water and part of the absorbed gases was separated from the salt solution at reduced pressure of the salt solution.

From the flash vessel the salt solution was passed to the pelletizer where soot and ash are removed by pelletizing them with a heavy hydrocarbon oil binder into agglomerates.

The salt solution was then passed into the stripper column wherein it is stripped with steam at substantially atmosphereic pressure. The stripping steam and the gases from the flash vessel can be passed to a Claus-plant to remove the sulfur compounds therefrom. The regenerated salt solution was recycled to the absorber column at 100° C.

What is claimed is:

1. In a process for manufacturing a hydrogen and carbon monoxide-containing gas by partially combusting a hydrocarbonaceous fuel in a reactor, cooling the crude gas obtained in a waste heat boiler and washing the cooled gas in a scrubber to remove entrained soot particles, the improvement which comprises; washing the crude, cooled gas in a scrubber with an aqueous salt solution containing at least 10%w of an alkaline water-soluble salt, said alkaline water-soluble salt being selected from the group consisting of sodium carbonate, potassium carbonate, sodium phosphate, potassium phosphate and mixtures thereof, which salt solution is subsequently regenerated by removal of absorbed gases and suspended soot and recycled to the scrubber and wherein said gas leaves the scrubber at a temperature of at least about 100° C.

2. The process according to claim 1, wherein the said fuel is partially combusted at elevated pressure in the reactor, the crude gas obtained thereby is cooled at substantially the same pressure in the waste heat boiler and the cooled gas is washed at substantially the same pressure in the scrubber, the temperature of the salt solution in the scrubber being below its boiling point at the prevailing pressure.

3. The process according to claim 1, wherein the temperature of the cooled gas entering the scrubber is above 150° C.

4. The process according to claim 3, wherein the temperature of the cooled gas entering the scrubber is above 250° C.

5. The process according to claim 4, wherein the temperature of the washed gas leaving the scrubber is between about 150° and about 100° C.

6. The process according to claim 5, wherein the temperature of the salt solution when entering the scrubber is below 100° C.

7. The process according to claim 6, wherein the temperature of the salt solution leaving the scrubber is between about 200° and about 150° C.

8. The process according to claim 1, wherein the salt solution contains 30–40%w of the salt.

9. The process according to claim 8, wherein the solution contains sodium phosphate.

10. The process according to claim 8, wherein the solution contains sodium carbonate.

11. The process according to claim 1, wherein the absorbed gases in the aqueous salt solution effluent from the scrubber are removed in a stripper by stripping the solution with steam.

12. The process according to claim 11, wherein said regeneration is carried out by stripping with low-pressure steam of between 100° and 150° C.

* * * * *